United States Patent Office 2,720,726
Patented Oct. 18, 1955

2,720,726

METHOD OF AND COMPOSITION FOR PROTECTING PLANT ROOTS AND THE LIKE

Carl S. Ferguson, Stratham, N. H.

No Drawing. Application March 23, 1951,
Serial No. 217,290

9 Claims. (Cl. 47—58)

This invention relates to a method of preparing plant roots for shipment or storage and to a composition of matter for protecting and nourishing such roots during the transplanting interval. In the nursery business, for example, it is necessary to transplant all sorts of trees, bushes, and plants (hereinafter inclusively referred to as "plants") which must be kept alive and healthy during the period from the digging up to the replanting, this period often including a considerable time interval required for transportation to the point of delivery. It is an object of the invention to treat the roots so as to keep the plants in healthy condition for considerable periods and to promote satisfactory growth when the plants have been replanted. Heretofore it has been customary to pack the roots in moist substances such as moss, shavings, loose fiber, sawdust, earth and the like to keep them from drying out during transit or storage. The use of such materials results in shipping parcels that are heavy and bulky. It is an object of the present invention to process the plants for shipment or storage so that the resulting packages will be comparatively light and compact and the roots will stay in good condition for a far longer period than has hitherto been thought possible.

According to the invention, the roots of plants which are to be shipped or stored are stripped of earth and are coated with a viscous composition which is adapted to protect and preserve them for considerable periods of time. The composition which is applied to the roots is sufficiently viscous so that when it is applied to roots, a thick film will remain as a covering or coating. The composition can be applied by any suitable method such as dipping, spraying or brushing. The coated roots may then be wrapped in a moisture-proof sheet to retard evaporation of moisture from the coating material and thus to prolong the period of effective preservation of the plant.

The coating material is a mixture of non-toxic ingredients selected chiefly for their physical characteristics to serve certain desirable purposes in the preservation of the health of the plant. For example, it is of prime importance that the roots be prevented from drying. Hence, an absorbent ingredient is employed to maintain moisture at the root surfaces, this ingredient being selected primarily for its ability to absorb and retain moisture. It is also desirable that this ingredient provide body or viscosity to the composition so as to form a relatively thick film on the root surfaces. For this purpose I preferably employ a gum or gum-like substance. Gum tragacanth, Karaya, Irish moss, locust bean gum, and sodium alginate are suitable for the purpose. However, I prefer to employ a water-miscible cellulose derivative having gum-like properties, a good example being sodium carboxy methyl cellulose (CMC) which can be used by itself or mixed with one or more of the gums aforementioned. These substances are preferably mixed with a suitable plasticizer to enhance their water-retaining property and thus to lower their already low rate of moisture loss when exposed to the air. These substances, especially when plasticized, have the desirable property of lending to the composition a sufficient degree of adhesiveness to cause the composition to adhere as a substantial coating to the root surfaces but without such cohesiveness as would cause the coated roots to stick together.

Other substances such as gum arabic or gelatin may be employed as the moisture-retaining ingredient, but these are less desirable than the examples previously given, for various reasons.

A plasticizer or softening agent is an important ingredient of the composition, since a suitable plasticizer not only improves the consistency of the composition but materially enhances the moisture-retaining properties of the gum or gum-like ingredient by lowering the vapor pressure of the mixture and also raising its boiling point. For this purpose, I may employ one or more of the higher alcohols, glycerine or one of the glycols. The plasticizer should possess sufficient hydroxyl groups to be reasonably water-soluble and should be of sufficiently high molecular weight to be reasonably chemically inert. For example, I may use one or more of the polyethylene glycols with or without the admixture of propylene glycol. I prefer to use polyethylene glycols or mixtures of such glycols having a molecular weight above 180, and a water solubility of at least 50% at 20° C.

If the composition as made up for application to plant roots is found to be difficult to spread over the root surfaces so as to cover them completely, especially when the roots include a mass of fine, hair-like branches, a wetting agent may be added to promote such spreading. Any of the well-known wetting agents now on the market can be used for that purpose, one example being dioctyl sodium sulpho-succinate which is sold under the name of "Aerosol OT."

To keep plant roots healthy, they should be supplied with small amounts of oxygen. One way of doing this is to whip the composition so as to form a mass of tiny air bubbles therein, the composition being sufficiently viscous to retain such bubbles. A more effective way is to include in the composition a compatible substance capable of yielding free oxygen. A peroxide is suitable for this purpose, especially if water soluble. For example, hydrogen peroxide or alkaline peroxides such as magnesium peroxide or calcium peroxide may be employed. The rate at which such peroxides yield free oxygen depends to some extent on the hydrogen ion concentration of the composition, which can be controlled to regulate the rate of supply to simulate the normal aeration of the soil which is necessary for proper health and growth of plants.

If an extended period of time for shipping or storage is expected, and especially if the plants are to be shipped or stored in a warm temperature, one or more preservative ingredients should be included in the composition to inhibit fermentation or bacteriological decomposition of the composition itself and to check the growth or development of molds or mildew in the composition or on the roots. If propylene glycol is used as a plasticizing agent, it will also serve as a preservative. Likewise, any of the peroxides hereinbefore mentioned will have a preservative effect. However, if additional preservative ingredients are desired or required, formalin or sodium propionate are effective for the purpose.

In addition to the foregoing, I prefer to include in the composition nutrients in the form of balanced plant foods or fertilizer supplying required amounts of nitrogen, phosphorus and potassium, and growth stimulating root hormones such as naphthyl acetamide or the methyl ester thereof, or the methyl ester of naphthyl acetic acid. These hormone substances can be used individually or mixed, with or without the addition of vitamin $B_1$. In the hormone substance as actually supplied, the active ingredients constitute only about .02% to .04% of the substance, the rest being inert.

Balanced fertilizers are readily available in made-up form on the market, being sold under various trade names. A good balanced fertilizer contains 7% nitrogen, 6% phosphoric acid and 19% potash, the rest of the fertilizer being inert filler.

The nutrients may include or consist of a suitable salt or salts such as monocalcium phosphate, monobasic ammonium phosphate, monobasic potassium phosphate, aluminum sulphate, or dibasic ammonium phosphate. These salts can be selected not only for their nutrient value but also for regulating the hydrogen ion concentration of the composition. For example, to increase the acidity of the composition, a monobasic phosphate may be added. Such control of acidity regulates the rate of yield of free oxygen from peroxides in the composition for use on plant roots which are accustomed to a particular type of soil. For example, plants or shrubs customarily growing in acid soil, such as rhododendrons or blueberries, are treated with a composition the acidity of which has been correspondingly increased.

Another useful function of a phosphate salt in the composition is the precipitation of metal ions when a peroxide of a metal is included in the composition.

The ingredients and proportions thereof employed in making up compositions embodying the invention may vary in accordance with the kind of plants to be treated and the anticipated conditions of shipping or storage. The following formulae are given by way of illustration:

EXAMPLE 1

1 lb. polyethylene glycol.
3 ozs. CMC.
1 gal. water.

EXAMPLE 2

1 lb. polyethylene glycol.
3 ozs. CMC.
10 cc. hydrogen peroxide (10% sol.).
10 grams monocalcium phosphate.
2 grams root-forming hormones.
1 gal. water.

EXAMPLE 3

1 lb. polyethylene glycol.
3 ozs. CMC.
10 grams calcium peroxide.
8–10 grams aluminum sulphate.
10 grams monocalcium phosphate.
10 grams balanced fertilizer.
2 grams root-forming hormones.
5 grams sodium propionate.
1 gram dioctyl sodium sulpho-succinate.
1 gal. water.

EXAMPLE 4

½ lb. polyethylene glycol.
½ lb. propylene glycol.
2 ozs. CMC.
2 ozs. gum tragacanth.
10 grams magnesium peroxide.
10 grams monocalcium phosphate.
10 grams balanced fertilizer.
10 grams formaldehyde, 40% solution.
2 grams hormones.
1 gal. water.

EXAMPLE 5

A batch of a little over 60 gallons of composition may be prepared by mixing the following:

5 gal. (40–50 lb.) polyethylene glycol.
6 lbs. CMC.
4½ ozs. calcium peroxide.
4 ozs. aluminum sulphate.
4 ozs. monocalcium phosphate.
6 ozs. balanced fertilizer.
2¼ ozs. root hormones.
100 ccs. pine oil (optional for flavor).
55 gals. water.

This mixture is in the form of a thick, viscous liquid, suitable for economical shipping. It may be applied to roots in that form, but if diluted with an equal volume of water, its consistency becomes that of light cream, suitable for spraying. The amounts of monocalcium phosphate and aluminum sulphate employed may be varied according to the degree of acidity desired for any particular batch. Besides helping to control acidity and hence the rate at which oxygen is released from the peroxide in the composition, the aluminum sulphate also undergoes a gradual double decomposition with the hydroxide resulting from the breaking up of the peroxide. If the peroxide used is calcium peroxide, this double decomposition precipitates out the metal ions, an excessive accumulation of which might be injurious to the roots.

In preparing plants for shipment, the freshly exhumed roots are quickly stripped of earth and then coated with composition. The coated roots are then wrapped in moisture-proof paper or an equivalent, whereupon the plant is ready for packaging for shipment or for storage. The ingredients of the composition serve not only to keep the plant roots healthy while they are out of the ground, but to provide nourishment to give the plant a good start in taking hold in the ground after it has been replanted.

Coloring matter and flavoring matter such as pine oil may be added to make the composition more attractive in appearance or odor, but these have no effect on the efficacy of the composition for its intended purpose.

It is evident that many changes may be made in the ingredients and the proportions thereof employed in making compositions embodying the invention. The foregoing examples are given by way of illustration and not limitation.

I claim:

1. A non-toxic composition of matter for protecting plant roots and the like, comprising a gum-like water-retaining agent, a polyethylene glycol which is solid at room temperature, a non-toxic oxygen-liberating substance, and sufficient water to make a viscous liquid.

2. A non-toxic composition of matter for protecting plant roots and the like, comprising sodium carboxy methyl cellulose, polyethylene glycol having a molecular weight greater than 180 and a water solubility of at least 50% at 20 C., and a non-toxic peroxide.

3. A non-toxic composition of matter for protecting plant roots and the like, comprising a mixture of ingredients in the proportion of one pound of a dry polyethylene glycol which is solid at room temperature, three ounces of dry sodium carboxy methyl cellulose and one gallon of water.

4. A non-toxic composition of matter for protecting plant roots and the like, comprising a mixture of ingredients in the proportion of one pound of polyethylene glycol, three ounces of sodium carboxy methyl cellulose, ten grams of calcium peroxide, ten grams of aluminum sulphate, ten cubic centimeters of 40% solution of formaldehyde, one gram of a wetting agent, and one gallon of water.

5. A method of preparing plant roots for shipment which consists of coating the roots with a non-toxic, viscous composition containing a gum-like water-absorbing and water-retaining agent, a plasticizing substance capable of enhancing the water-retaining properties of said agent, a mold-inhibiting substance, a source of free oxygen, and wrapping the coated roots in moisture-proof sheet material.

6. A non-toxic composition of matter for protecting plant roots and the like, comprising sodium carboxy methyl cellulose, a polyethylene glycol which is solid at room temperature and water-soluble, magnesium peroxide, and sufficient water to make a viscous liquid.

7. A non-toxic composition for protecting plant roots and the like, comprising a gum-like water-retaining agent, a water-soluble plasticising substance to enhance the water-retaining property of said agent, which substance is solid at room temperature and has a molecular weight greater than 180, and water.

8. A non-toxic composition for protecting plant roots and the like, comprising sodium carboxy methyl cellulose, a plasticizing substance consisting of a polyethylene glycol which is solid at room temperature, and sufficient water to make a viscous liquid.

9. A non-toxic composition for protecting plant roots and the like, comprising sodium carboxy methyl cellulose, a water-soluble polyethylene glycol which is solid at room temperature, a non-toxic water-soluble alkaline peroxide, and sufficient water to make a viscous liquid.

References Cited in the file of this patent

UNITED STATES PATENTS

| | | |
|---|---|---|
| Re. 22,420 | Du Puis | Jan. 18, 1944 |
| 1,909,013 | Ruzicka | May 16, 1933 |
| 1,962,996 | Muller | June 12, 1934 |
| 1,995,853 | Hunsaker | Mar. 26, 1935 |
| 2,013,063 | Miller | Sept. 3, 1935 |
| 2,128,973 | Tisdale | Sept. 6, 1938 |
| 2,203,274 | Anderson | June 4, 1940 |
| 2,296,584 | Stummeyer | Sept. 22, 1942 |
| 2,314,928 | Fischer | Mar. 30, 1943 |
| 2,558,042 | Cornwell | June 26, 1951 |

FOREIGN PATENTS

| | | |
|---|---|---|
| 131,784 | Great Britain | 1919 |
| 406,737 | Great Britain | Mar. 5, 1934 |

OTHER REFERENCES

Synthetic Organic Chemicals, 12th ed. (July 1, 1945), pp. 21, 22, pub. by Carbide & Carbon Chemicals Co.

National Paint, Varnish & Lacquer Assn., Scientific Section, Circular 688, August 1944, pp. 191–194.